US011643064B2

(12) United States Patent
Hashimoto et al.

(10) Patent No.: US 11,643,064 B2
(45) Date of Patent: May 9, 2023

(54) VEHICLE CONTROL METHOD, VEHICLE CONTROLLER, AND SERVER

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/158,090

(22) Filed: Jan. 26, 2021

(65) Prior Publication Data

US 2021/0237773 A1     Aug. 5, 2021

(30) Foreign Application Priority Data

Feb. 4, 2020   (JP) .............................. JP2020-016977

(51) Int. Cl.
| | |
|---|---|
| *B60W 60/00* | (2020.01) |
| *B60W 10/06* | (2006.01) |
| *B60W 50/04* | (2006.01) |
| *G06N 20/00* | (2019.01) |
| *G06F 18/21* | (2023.01) |
| *B60W 50/00* | (2006.01) |

(52) U.S. Cl.
CPC .......... *B60W 10/06* (2013.01); *B60W 50/045* (2013.01); *B60W 60/0023* (2020.02); *G06F 18/2193* (2023.01); *G06N 20/00* (2019.01); *B60W 2050/0013* (2013.01)

(58) Field of Classification Search
None
See application file for complete search history.

(56) References Cited

U.S. PATENT DOCUMENTS

| | | | |
|---|---|---|---|
| 10,773,727 B1 * | 9/2020 | Ivanyi | ..................... B60K 35/00 |
| 2017/0089274 A1 | 3/2017 | Kolhouse et al. | |
| 2020/0031371 A1 * | 1/2020 | Soliman | ................ B60W 10/04 |
| 2021/0053487 A1 * | 2/2021 | Vangelov | ................ B60K 35/00 |
| 2021/0179062 A1 * | 6/2021 | Lee | ..................... B60W 30/188 |
| 2021/0276531 A1 * | 9/2021 | Xu | ......................... B60W 20/20 |

FOREIGN PATENT DOCUMENTS

| | | |
|---|---|---|
| JP | 2010-086405 A | 4/2010 |
| JP | 2016-006327 A | 1/2016 |

* cited by examiner

*Primary Examiner* — James M McPherson
(74) *Attorney, Agent, or Firm* — Oblon, McClelland, Maier & Neustadt, L.L.P.

(57) ABSTRACT

An execution device executes an obtaining process that obtains a state of a vehicle, an operating process that operates an electronic device of the vehicle based on the state of the vehicle obtained by the obtaining process and operation data, a performance determining process that determines whether an environmental performance of the vehicle when the electronic device is operated is lower than a determination performance, and a data updating process that updates the operation data so as to increase the environmental performance of the vehicle when the performance determining process determines that the environmental performance of the vehicle is lower than the determination performance.

10 Claims, 7 Drawing Sheets

VEHICLE CONTROL METHOD, VEHICLE CONTROLLER, AND SERVER

BACKGROUND

1. Field

The present disclosure relates to a vehicle control method, a vehicle controller, and a server.

2. Description of Related Art

Japanese Laid-Open Patent Publication No. 2016-6327 discloses a controller that controls a throttle valve based on a value obtained by performing a filtering process for an operation amount of an accelerator pedal.

For the filter used for the filtering process, the operation amount of the throttle valve needs to be set to an appropriate operation amount in correspondence with the operation amount of the accelerator pedal. Thus, adapting the filter requires a great number of man-hours by skilled workers. In this manner, adapting operation amounts of electronic devices in a vehicle in correspondence with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To solve the above-described problem, a first aspect of the present disclosure provides a vehicle control method using a memory device and an execution device. The vehicle control method includes storing, in the memory device, operation data used to operate an electronic device of a vehicle. The vehicle control method includes, with the operation data stored in the memory device, by the execution device, executing: an obtaining process that obtains a state of the vehicle based on a detection value of a sensor provided in the vehicle; an operating process that operates the electronic device based on the state of the vehicle obtained by the obtaining process and the operation data; a performance determining process that determines whether an environmental performance of the vehicle is lower than a determination performance when the electronic device is operated by executing the operating process; and a data updating process that updates the operation data so as to increase the environmental performance of the vehicle in a case where the performance determining process determines that the environmental performance of the vehicle is lower than the determination performance.

The environmental performance of the vehicle is higher when the operation data used to operate the electronic device corresponds to the characteristic of the electronic device at that time than when the operation data does not correspond to the characteristic. When the operation data optimized for the characteristic of the electronic device at that time is set as optimal data and the environmental performance is determined as being lower than the determination performance, the operation data is predicted to be deviated from the optimal data.

In the above-described configuration, when the environmental performance of the vehicle in a case where the electronic device is operated using the operation data is determined as being lower than the determination performance, the operation data is updated such that the environmental performance of the vehicle increases. Updating the operation data during use of the vehicle in such a manner allows the operation data to become close to the optimal data. Thus, operating the electronic device using the operation data updated in such a manner contributes to the improvement of the environmental performance of the vehicle.

In the vehicle control method, it is preferred that the operation data be relationship defining data defining a relationship between the state of the vehicle and an action variable, the action variable being related to operation of the electronic device. It is preferred that the operating process operate the electronic device based on a value of the action variable, the value being determined by the state of the vehicle obtained by the obtaining process and the relationship defining data. It is preferred that the vehicle control method further include executing, by the execution device, a reward calculating process that provides, based on the state of the vehicle when the electronic device is operated, a greater reward when a characteristic of the vehicle meets a predetermined standard than when the characteristic of the vehicle does not meet the predetermined standard, and an updating process that updates the relationship defining data by inputting, to an update map defined in advance, the state of the vehicle when the electronic device is operated, the value of the action variable used to operate the electronic device, and the reward corresponding to the operation of the electronic device. It is preferred that the update map output the updated relationship defining data so as to increase an expected return for the reward when the electronic device is operated in accordance with the relationship defining data.

In the above-described configuration, by calculating the reward that results from the operation of the electronic device of the vehicle, it is possible to acknowledge what kind of reward is obtained by the operation. Updating the relationship defining data in accordance with the update map conforming to reinforcement learning based on the obtained reward allows the relationship between the state of the vehicle and the action variable to be suitable for the traveling of the vehicle. This optimizes the relationship between the state of the vehicle and the action variable for the traveling of the vehicle. That is, updating the relationship defining data allows the relationship defining data to become an optimal state. Thus, operating the electronic device using such operation data improves the environmental performance of the vehicle.

In the vehicle control method, it is preferred that the data updating process update the relationship defining data so as to increase the environmental performance of the vehicle by setting the reward, which is provided when the characteristic of the vehicle meets the predetermined standard, to be greater in the case where the performance determining process determines that the environmental performance of the vehicle is lower than the determination performance than in a case where the performance determining process does not determine that the environmental performance of the vehicle is lower than the determination performance.

When the environmental performance of the vehicle is determined as being lower than the determination performance, there is a possibility that optimization has not sufficiently progressed in the relationship between the state of the vehicle and the action variable. In the above-described configuration, when the environmental performance of the vehicle is determined being lower than the determination performance, the reward provided when the characteristic of the vehicle is met is increased. Thus, after the environmental performance of the vehicle is determined as being lower than the determination performance, the relationship between the state of the vehicle and the action variable prior to that determination is optimized quickly. That is, increasing the update speed of the relationship defining data updates relationship defining data such that the environmental performance of the vehicle increases. Accordingly, the environmental performance of the vehicle is improved by changing the manner of the reward in this manner when the environmental performance of the vehicle is determined as being lower than the determination performance because of a delay in the optimization of the state of the vehicle and the action variable, In the vehicle control method, it is preferred that the data updating process update the relationship defining data so as to increase the environmental performance of the vehicle by replacing the relationship defining data stored in the memory device with relationship defining data of a different vehicle in which the environmental performance is higher than the determination performance.

When the environmental performance of the vehicle is determined as being lower than the determination performance, there is a possibility that optimization has not sufficiently progressed in the relationship between the state of the vehicle and the action variable. In the above-described configuration, when the environmental performance of the vehicle is determined being lower than the determination performance, the relationship defining data stored in the memory device of the vehicle is replaced with the relationship defining data used in the different vehicle having an environmental performance that is higher than the determination performance. This causes the relationship defining data to be updated such that the environmental performance increases. Accordingly, the environmental performance of the vehicle is improved by replacing the relationship defining data in this manner when the environmental performance of the vehicle is determined as being lower than the determination performance because of a delay in the optimization of the state of the vehicle and the action variable, It is preferred that the vehicle control method include executing, by the execution device, a condition estimating process that estimates a travel condition of the vehicle based on the state of the vehicle obtained by the obtaining process and a travel environment of the vehicle, and a determination performance setting process that sets the determination performance based on environmental performances of vehicles traveling under a travel condition that is determined as being the same as the travel condition of the vehicle that has been estimated by the condition estimating process.

In the above-described configuration, the determination performance is set based on the environmental performances of the vehicles traveling under similar travel conditions. That is, the value of the determination performance can be based on actual traveling of a vehicle instead of setting a fixed value in advance according to a vehicle type. Thus, the environmental performance of the vehicle is properly acknowledged.

In the vehicle control method, it is preferred that the determination performance setting process set the determination performance based on an average of index values indicating the environmental performances of the vehicles.

In the vehicle control method, it is preferred that the environmental performance of the vehicle be an energy use efficiency of the vehicle.

In the vehicle control method, it is preferred that the execution device include a first execution device provided in the vehicle and a second execution device that communicates with the first execution device. It is preferred that the memory device be provided in the vehicle. It is preferred that the obtaining process and the operating process be executed by the first execution device. It is preferred that the performance determining process be executed by the first execution device or the second execution device. It is preferred that the data updating process be executed through cooperation of the first execution device and the second execution device.

To solve the above-described problem, a second aspect of the present disclosure provides a vehicle controller that includes an execution device and a memory device. The memory device is configured to store operation data used to operate an electronic device of a vehicle. With the operation data stored in the memory device, the execution device is configured to execute: an obtaining process that obtains a state of the vehicle based on a detection value of a sensor provided in the vehicle; an operating process that operates the electronic device based on the state of the vehicle obtained by the obtaining process and the operation data; a performance determining process that determines whether an environmental performance of the vehicle is lower than a determination performance when the electronic device is operated by executing the operating process; and a data updating process that updates the operation data so as to increase the environmental performance of the vehicle in a case where the performance determining process determines that the environmental performance of the vehicle is lower than the determination performance.

To solve the above-described problem, a third aspect of the present disclosure provides a vehicle controller that includes an execution device and a memory device. The memory device is configured to store operation data used to operate an electronic device of a vehicle. With the operation data stored in the memory device, the execution device is configured to execute: an obtaining process that obtains a state of the vehicle based on a detection value of a sensor provided in the vehicle; an operating process that operates the electronic device based on the state of the vehicle obtained by the obtaining process and the operation data; a performance determining process that determines whether an environmental performance of the vehicle is lower than a determination performance when the electronic device is operated by executing the operating process; and a data updating process that updates the operation data so as to increase the environmental performance of the vehicle in a case where the performance determining process determines that the environmental performance of the vehicle is lower than the determination performance. The operation data is relationship defining data defining a relationship between the state of the vehicle and an action variable, the action variable being related to operation of the electronic device. The operating process operates the electronic device based on a value of the action variable, the value being determined by the state of the vehicle obtained by the obtaining process and the relationship defining data. The execution device is further configured to execute: a reward calculating process that provides, based on the state of the vehicle when the electronic device is operated, a greater reward when a characteristic of the vehicle meets a predetermined standard than when the characteristic of the vehicle does not meet the predetermined standard; and an updating process that updates the relationship defining data by inputting, to an update map defined in advance, the state of the vehicle when the electronic device is operated, the value of the action variable used to operate the electronic device, and the reward corresponding to the operation of the electronic device. The update map outputs the updated relationship defining data so as to increase an expected return for the reward when the electronic device is operated in accordance with the relationship defining data. The data updating process updates the relationship defining data so as to increase the environmental performance of the vehicle by replacing the relationship defining data stored in the memory device with relationship defining data of a different vehicle in which the environmental performance is higher than the determination performance. The execution device includes a first execution device provided in the vehicle and a second execution device that communicates with the first execution device. The memory device is provided in the vehicle, the obtaining process and the operating process are executed by the first execution device. The performance determining process is executed by the first execution device or the second execution device. The data updating process is executed through cooperation of the first execution device and the second execution device. The vehicle controller includes the first execution device and the memory device.

In the above-described configuration, the execution device includes the first execution device and the second execution device. Thus, as compared with when the processes are all executed by one execution device, the control load on the execution device is reduced.

To solve the above-described problem, a fourth aspect of the present disclosure provides a server capable of communicating with a vehicle controller including an execution device and a memory device. The memory device is configured to store operation data used to operate an electronic device of a vehicle. With the operation data stored in the memory device, the execution device is configured to execute: an obtaining process that obtains a state of the vehicle based on a detection value of a sensor provided in the vehicle; an operating process that operates the electronic device based on the state of the vehicle obtained by the obtaining process and the operation data; a performance determining process that determines whether an environmental performance of the vehicle is lower than a determination performance when the electronic device is operated by executing the operating process; and a data updating process that updates the operation data so as to increase the environmental performance of the vehicle in a case where the performance determining process determines that the environmental performance of the vehicle is lower than the determination performance. The operation data is relationship defining data defining a relationship between the state of the vehicle and an action variable, the action variable being related to operation of the electronic device. The operating process operates the electronic device based on a value of the action variable, the value being determined by the state of the vehicle obtained by the obtaining process and the relationship defining data. The execution device is further configured to execute: a reward calculating process that provides, based on the state of the vehicle when the electronic device is operated, a greater reward when a characteristic of the vehicle meets a predetermined standard than when the characteristic of the vehicle does not meet the predetermined standard; and an updating process that updates the relationship defining data by inputting, to an update map defined in advance, the state of the vehicle when the electronic device is operated, the value of the action variable used to operate the electronic device, and the reward corresponding to the operation of the electronic device. The update map outputs the updated relationship defining data so as to increase an expected return for the reward when the electronic device is operated in accordance with the relationship defining data. The data updating process updates the relationship defining data so as to increase the environmental performance of the vehicle by replacing the relationship defining data stored in the memory device with relationship defining data of a different vehicle in which the environmental performance is higher than the determination performance. The execution device includes a first execution device provided in the vehicle and a second execution device that communicates with the first execution device. The memory device is provided in the vehicle, the obtaining process and the operating process are executed by the first execution device. The performance determining process is executed by the first execution device or the second execution device. The data updating process is executed through cooperation of the first execution device and the second execution device, and the server is capable of communicating with the vehicles and comprises the second execution device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A vehicle control method, a vehicle controller, and a server according to a first embodiment will now be described with reference to the drawings.

Figure 1:
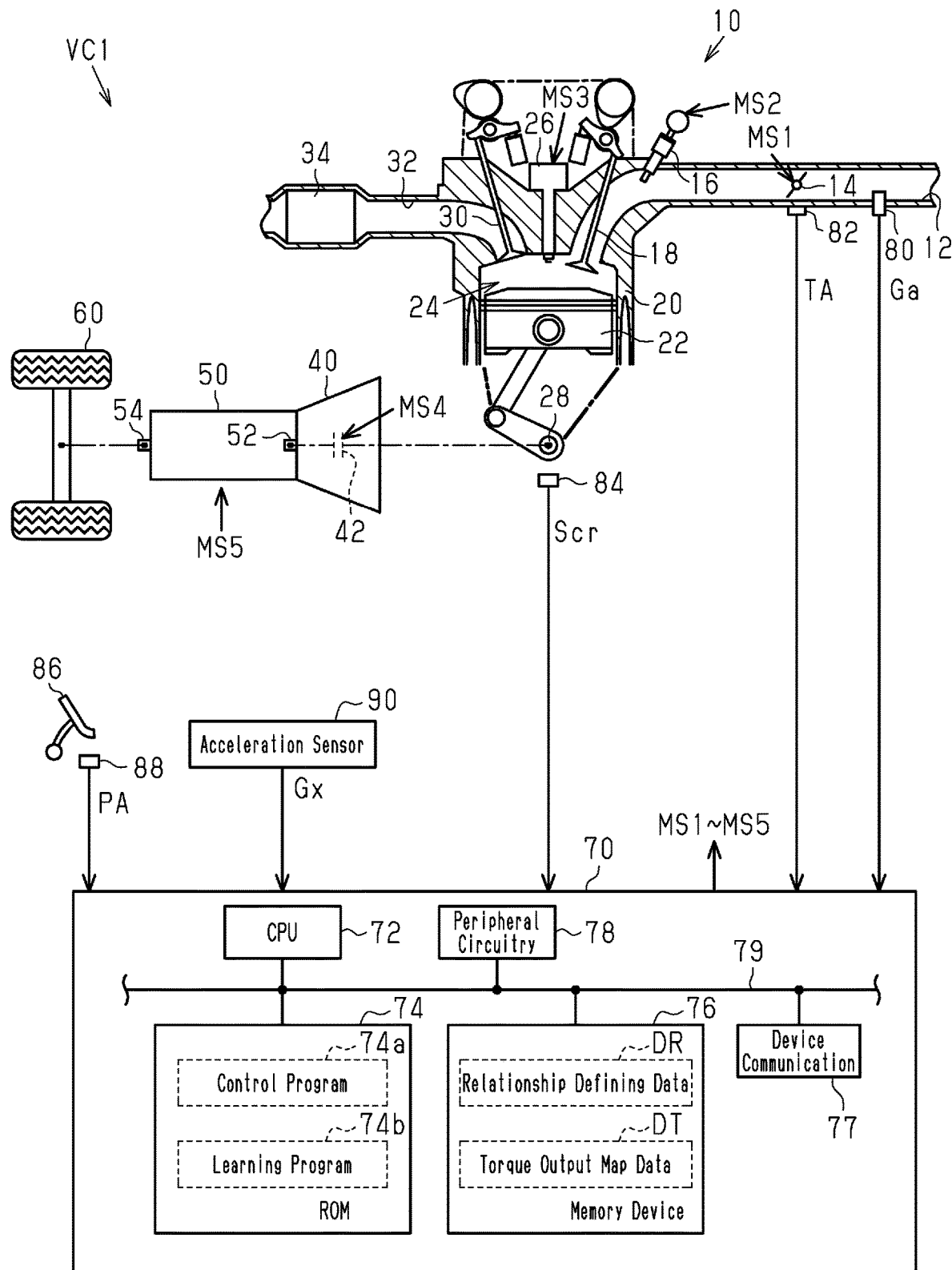
FIG. 1 is a diagram showing a controller and a driving system according to a first embodiment.

FIG. 1 shows the configuration of a controller 70, which is the vehicle controller, and a driving system of a vehicle VC1, which includes the controller 70.

As shown in FIG. 1, the vehicle VC1 include an internal combustion engine 10 as a propelling force generator for the vehicle VC1. The internal combustion engine 10 includes an intake passage 12, which is provided with a throttle valve 14 and a fuel injection valve 16 sequentially from the upstream side. The air drawn into the intake passage 12 and the fuel injected from the fuel injection valve 16 flow into a combustion chamber 24, which is defined by a cylinder 20 and a piston 22, as the intake valve 18 opens. In the combustion chamber 24, the air-fuel mixture of the fuel and the air is burned by spark discharge of the ignition device 26. The energy generated by the combustion is converted into rotation energy of a crankshaft 28 by the piston 22. The burned air-fuel mixture is discharged to an exhaust passage 32 as exhaust gas when an exhaust valve 30 is opened. The exhaust passage 32 is provided with a catalyst 34, which is an aftertreatment device for purifying exhaust gas.

The crankshaft 28 is mechanically couplable to an input shaft 52 of a transmission 50 via a torque converter 40 equipped with a lockup clutch 42. The transmission 50 controls a gear ratio, which is the ratio of the rotation speed of the input shaft 52 to the rotation speed of an output shaft 54. The output shaft 54 is mechanically coupled to the driven wheels 60.

The controller 70 controls the internal combustion engine 10. The controller 70 controls operation parts of the engine 10 such as the throttle valve 14, the fuel injection valve 16, and the ignition device 26 to control, for example, torque and exhaust component ratios. The controller 70 controls the torque converter 40. The controller 70 operates the lockup clutch 42 to control an engagement state of the lockup clutch 42. The controller 70 controls the transmission 50. The controller 70 operates the transmission 50 to control the gear ratio. FIG. 1 shows operation signals MS1 to MS5, which respectively correspond to the throttle valve 14, the fuel injection valve 16, the ignition device 26, the lockup clutch 42, and the transmission 50. Each of the operation parts receiving the operation signals MS1 to MS5 from the controller 70 is an example of electronic devices.

To control the internal combustion engine 10, the controller 70 refers to an intake air amount Ga detected by an air flow meter 80, a throttle opening degree TA (an opening degree of the throttle valve 14 detected by a throttle sensor 82), and an output signal Scr of a crank angle sensor 84. The controller 70 refers to an accelerator operation amount PA (a depression amount of an accelerator pedal 86 detected by an accelerator sensor 88) and an acceleration Gx in the front-rear direction of the vehicle VC1 detected by an acceleration sensor 90.

The controller 70 includes a CPU 72, a ROM 74, a memory device 76 (electrically rewriteable nonvolatile memory), a communication device 77, and peripheral circuitry 78. The CPU 72, the ROM 74, the memory device 76, the communication device 77, and the peripheral circuitry 78 are connected to each other in a communicable manner via a local network 79. The peripheral circuitry 78 includes, for example, a circuit that generates a clock signal defining internal operations, a power supply circuit, and a reset circuit.

The ROM 74 stores a control program 74a and a learning program 74b. The memory device 76 stores relationship defining data DR. The relationship defining data DR is used to operate the electronic devices of the vehicle VC1, such as the throttle valve 14 and the ignition device 26. The relationship defining data DR defines the relationship of the accelerator operation amount PA with a throttle opening degree command value TA* (a command value of the throttle opening degree TA) and a retardation amount aop of the ignition device 26. The throttle opening degree command value TA* and the retardation amount aop are an example of an action variable. The retardation amount aop is a retardation amount in relation to a predetermined reference ignition timing. The reference ignition timing is the more retarded one of a MBT ignition timing and a knock limit point. The MBT ignition timing is the ignition timing at which the maximum torque is obtained (maximum torque ignition timing). The knock limit point is the advancement limit value of the ignition timing at which knocking can be limited to an allowable level under the assumed best conditions during the use of a large-octane-number fuel, which has a large knock limit value. The memory device 76 also stores torque output map data DT. The torque output map data DT defines a torque output map, in which a rotation speed NE of the crankshaft 28, a charging efficiency and an ignition timing aig are used as inputs and a torque Trq is used as an output.

Figure 2:
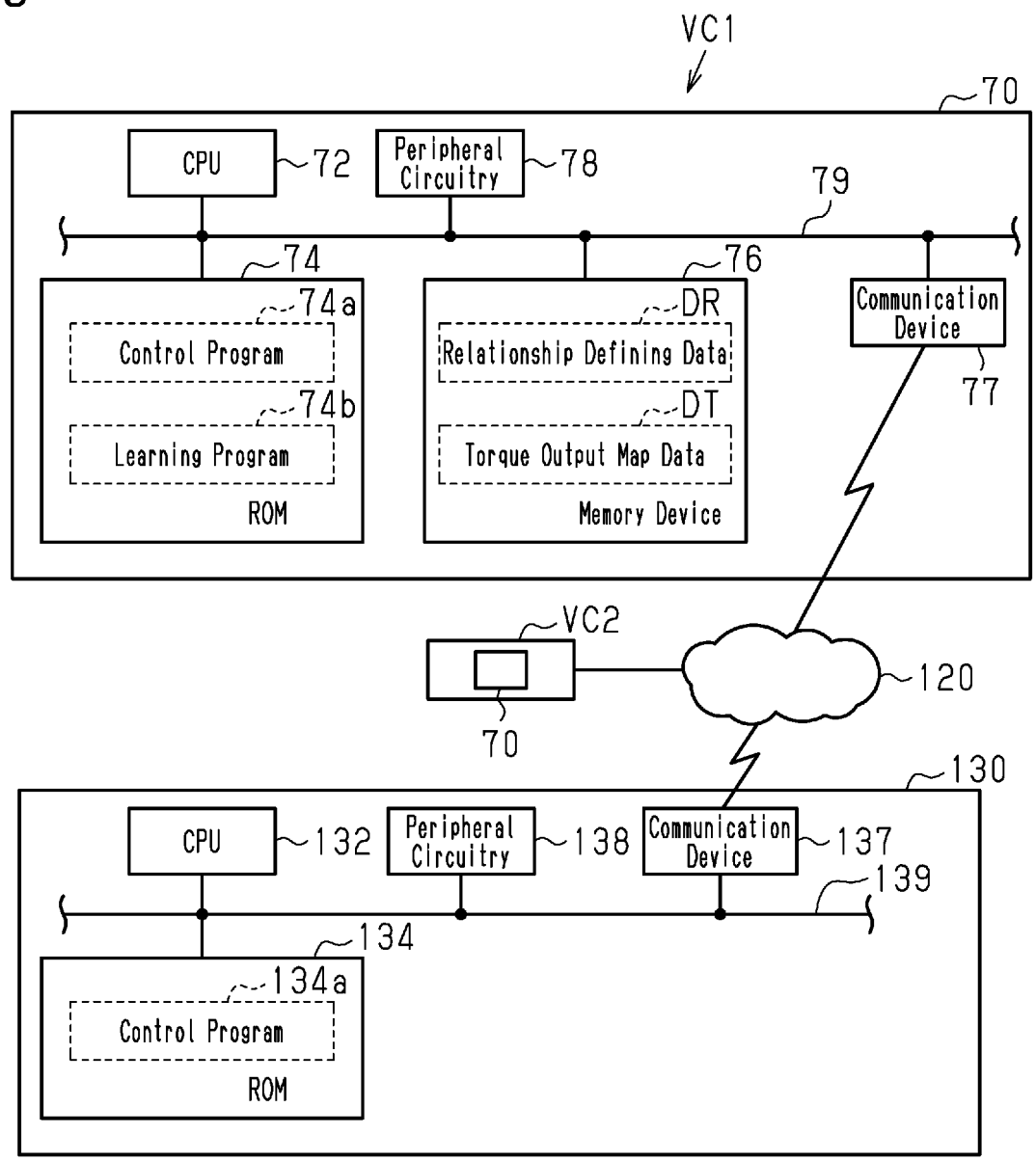
FIG. 2 is a block diagram schematically showing the configuration of the controller and the configuration of a server that communicates with the vehicle.

As shown in FIG. 2, a server 130 is arranged outside of the vehicle VC1. The communication device 77 communicates with the server 130 via a network 120, which is arranged outside of the vehicle VC1.

The server 130 analyzes the data transmitted from vehicles VC1, VC2, . . . . The server 130 includes a CPU 132, a ROM 134, peripheral circuitry 138, and a communication device 137. The CPU 132, the ROM 134, the peripheral circuitry 138, and the communication device 137 are connected to each other in a communicable manner via a local network 139. The ROM 134 stores a control program 134a.

Figure 3:
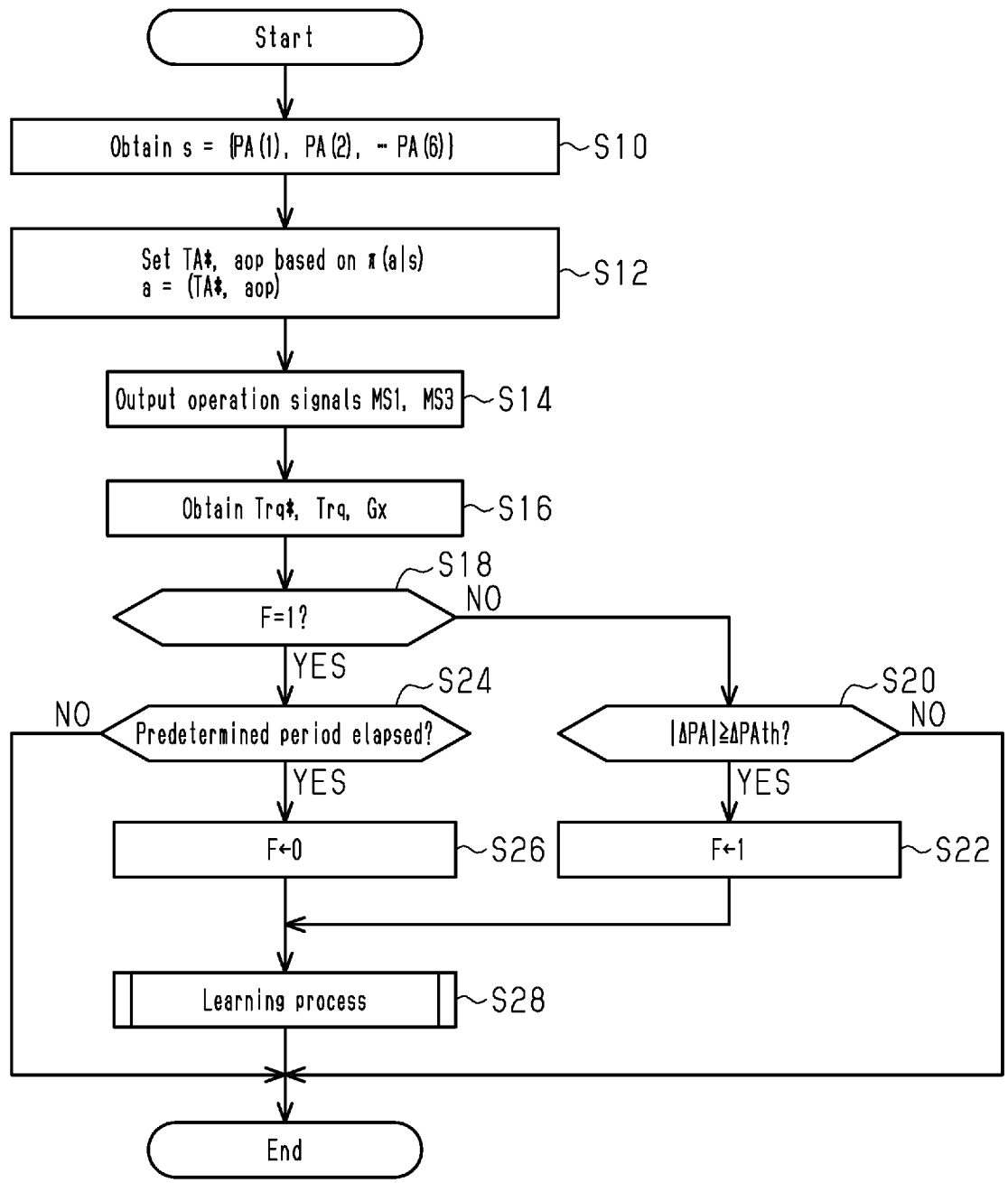
FIG. 3 is a flowchart illustrating a procedure of processes executed by the controller.

FIG. 3 illustrates a procedure of processes executed by the controller 70. The processes illustrated in FIG. 3 are implemented by the CPU 72 repeatedly executing the control program 74a and the learning program 74b stored in the ROM 74, for example, in predetermined cycles. In the following description, the number of each step is represented by the letter S followed by a numeral.

In the series of processes illustrated in FIG. 3, the CPU 72 obtains, as a state s, time-series data including six sampled values PA(1), PA(2), . . . PA(6) (S10). The sampled values of the time-series data have been sampled at different points in time. The time-series data includes six sampled values that are consecutive in time and have been sampled in a constant cycle.

Next, in accordance with a policy π defined by the relationship defining data DR, the CPU 72 sets the throttle opening degree command value TA* and the retardation amount aop that correspond to the state s obtained through the process of S10 and sets an action a including the throttle opening degree command value TA* and retardation amount aop (S12).

The relationship defining data DR defines an action value function Q and the policy π The action value function Q is a table-type function representing values of expected return in accordance with eight-dimensional independent variables of the state s and the action a. When the state s is provided, the action value function Q includes the action a (greedy action) at which the independent variable is the provided state s and the value of the expected return is maximized. The policy π defines rules with which the greedy action is preferentially selected and an action a different from the greedy action is selected with a predetermined probability.

Specifically, the number of the values of the independent variable of the action value function Q is obtained by deleting a certain amount from all the possible combinations of the state s and the action a, referring to human knowledge and the like. For example, in time-series data of the accelerator operation amount PA, human operation of the accelerator pedal 86 would never create a situation in which one of two consecutive sampled values is the minimum value of the accelerator operation amount PA and the other one is the maximum value of the accelerator operation amount PA. Thus, the action value function Q is not defined. Reduction of the dimensions based on human knowledge limits the number of the possible values of the state s that defines the action value function Q to a number less than or equal to 10 to the fourth power, and preferably, to a number less than or equal to 10 to the third power.

Then, the CPU 72 outputs the operation signal MS1 to the throttle valve 14 based on the set throttle opening degree command value TA* and retardation amount aop to adjust the throttle opening degree TA, and outputs the operation signal MS3 to the ignition device 26 to adjust the ignition timing (S14). An example is illustrated in which the throttle opening degree TA is feedback-controlled to the throttle opening degree command value TA*. Thus, even if the throttle opening degree command value TA* remains the same value, the operation signal MS1 may be a different signal. Further, when a known knock control system (KCS) is operating, the ignition timing is set to the value obtained by feedback-correcting, in the KCS, the value obtained by retarding the reference ignition timing by the retardation amount aop. The reference ignition timing is variably set by the CPU 72 in correspondence with the rotation speed NE of the crankshaft 28 and the charging efficiency π. The rotation speed NE is calculated by the CPU 72 based on the output signal Scr of the crank angle sensor 84. The charging efficiency η is calculated by the CPU 72 based on the rotation speed NE and the intake air amount Ga.

Subsequently, the CPU 72 obtains a torque Trq for the internal combustion engine 10, a torque command value Trq* for the internal combustion engine 10, and the acceleration Gx (S16). The CPU 72 calculates the torque Trq by inputting the rotation speed NE and the charging efficiency η and the ignition timing to the torque output map. Further, the CPU 72 sets the torque command value Trq* in correspondence with the accelerator operation amount PA.

Next, the CPU 72 determines whether a transient flag F is 1 (S18). The value 1 of the transient flag F indicates that a transient operation is being performed, and the value 0 of the transient flag F indicates that the transient operation is not being performed. When the transient flag F is 0 (S18: NO), the CPU 72 determines whether the absolute value of a change amount per unit time ΔPA of the accelerator operation amount PA is greater than or equal to a predetermined amount ΔPAth (S20). The change amount per unit time ΔPA simply needs to be the difference between the latest accelerator operation amount PA at the point in time of execution of S20 and the accelerator operation amount PA of the point in time that precedes the execution point in time by a unit time.

When the absolute value of the change amount ΔPA is greater than or equal to the predetermined amount ΔPAth (S20: YES), the CPU 72 assigns 1 to the transient flag F (S22).

In contrast, when the transient flag F is 1 (S18: YES), the CPU 72 determines whether a predetermined period has elapsed from the point in time of the execution of the process of S22 (S24). In the predetermined period, the absolute value of the change amount per unit time ΔPA of the accelerator operation amount PA remains less than or equal to a specified amount, which is smaller than the predetermined amount ΔPAth, over a predetermined time. When the predetermined period has elapsed (S24: YES), the CPU 72 assigns 0 to the transient flag F (S26).

When the process of S22 or S26 is completed, the CPU 72 assumes that one episode has ended and performs reinforcement learning to update the action value function Q (S28).

Figure 4:
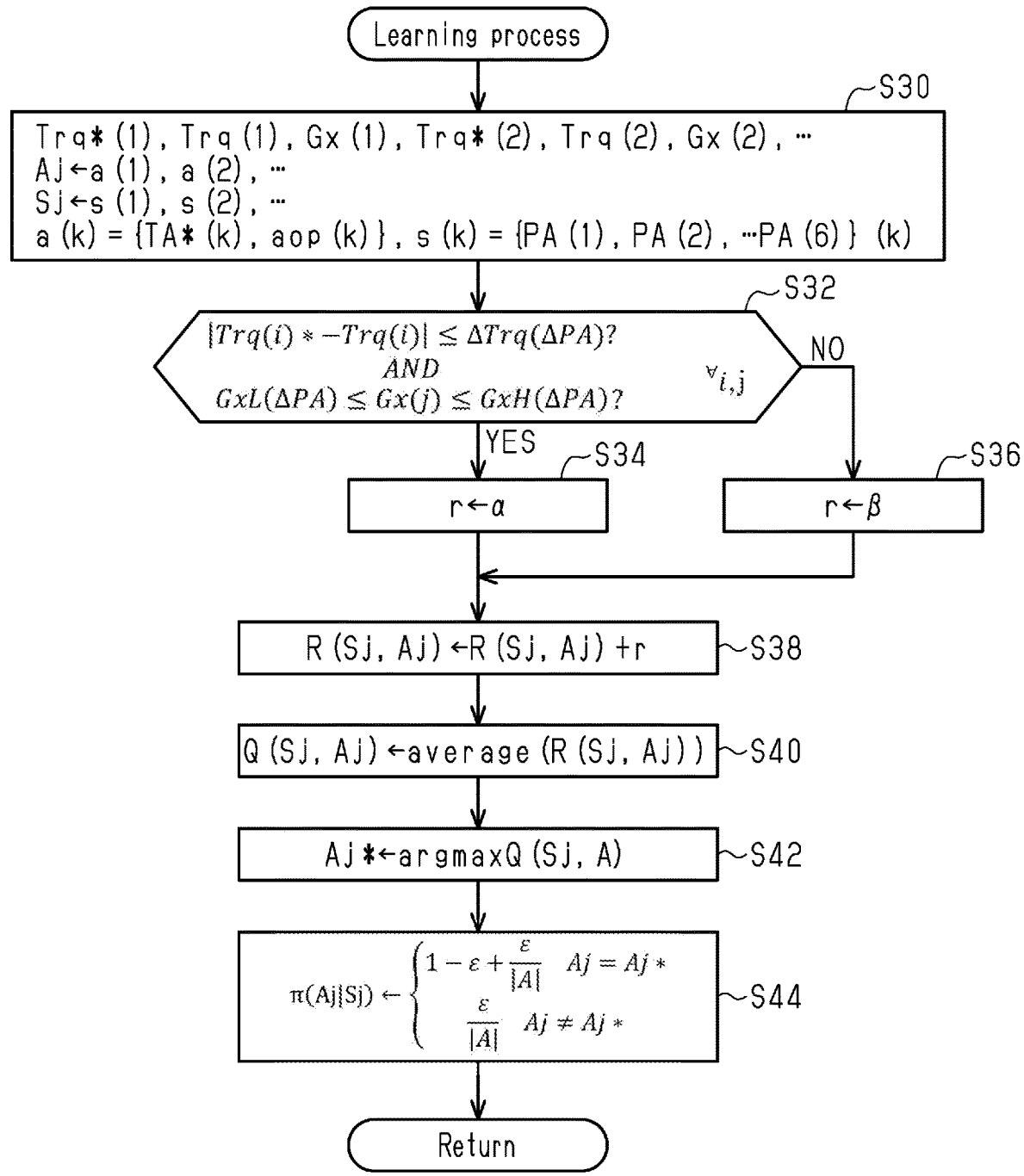
FIG. 4 is a flowchart illustrating the details of a learning process according to the first embodiment.

FIG. 4 illustrates the details of the process of S28.

In a series of processes illustrated in FIG. 4, the CPU 72 obtains time-series data including groups of three sampled values of the torque command value Trq*, the torque Trq, and the acceleration Gx in the episode that has been ended most recently, and obtains time-series data of the state s and the action a (S30). The most recent episode has a period during which the transient flag F was continuously 0 in the case of executing the process of S30 after executing the process of S22 and during which the transient flag F was continuously 1 in the case of executing the process of S30 after executing the process of S26.

In FIG. 4, variables of which the numbers in parentheses are different indicate the values of variables at different sampling points in time. A torque command value Trq*(1) and a torque command value Trq*(2) have been obtained at different sampling points in time. The time-series data of the action a belonging to the most recent episode is defined as an action set Aj. The time-series data of the states belonging to the same episode is defined as a state set Sj.

Then, the CPU 72 determines whether the logical conjunction is true of condition (a), in which the absolute value of the difference between an arbitrary torque Trq and the torque command value Trq* that belong to the most recent episode is less than or equal to a specified amount ΔTrq, and condition (b), in which the acceleration Gx is greater than or equal to a lower limit value GxL and less than or equal to an upper limit value GxH (S32).

The CPU 72 variably sets the specified amount ΔTrq depending on the change amount per unit time ΔPA of the accelerator operation amount PA at the start of the episode. That is, when determining that the episode is related to transient time based on the change amount per unit time ΔPA of the accelerator operation amount PA at the start of the episode, the CPU 72 sets the specified amount ΔTrq to a greater value than in a case in which the episode is related to steady time.

Further, the CPU 72 variably sets the lower limit value GxL depending on the change amount ΔPA of the accelerator operation amount PA at the start of the episode. That is, when the episode is related to transient time and the change amount ΔPA has a positive value, the CPU 72 sets the lower limit value GxL to a greater value than in a case in which the episode is related to steady time. When the episode is related to transient time and the change amount ΔPA has a negative value, the CPU 72 sets the lower limit value GxL to a smaller value than in a case in which the episode is related to steady time.

Also, the CPU 72 variably sets the upper limit value GxH depending on the change amount ΔPA of the accelerator operation amount PA at the start of the episode. That is, when the episode is related to transient time and the change amount ΔPA has a positive value, the CPU 72 sets the upper limit value G×H to a greater value than in a case in which the episode is related to steady time. When the episode is related to transient time and the change amount ΔPA has a negative value, the CPU 72 sets the upper limit value G×H to a smaller value than in a case in which the episode is related to steady time.

Reinforcement learning is performed in order to improve an energy use efficiency of the vehicle VC1. For example, when the energy use efficiency of the vehicle VC1 is improved by increasing the fuel economy of the internal combustion engine 10, it is desirable to limit a sudden change in the torque Trq of the internal combustion engine 10. Thus, in the first embodiment, the specified amount ΔTrq is set to be a greater value than when reinforcement learning is performed by prioritizing the improvement of acceleration response over the improvement of the energy use efficiency. Further, in the first embodiment, the upper limit value G×H and the lower limit value G×L are set such that the difference between the upper limit value G×H and the lower limit value G×L becomes smaller than when reinforcement learning is performed by prioritizing the improvement of the acceleration response over the improvement of the energy use efficiency.

In the reinforcement learning that prioritizes the improvement of the acceleration response, when the accelerator operation amount PA is increased, a greater reward is provided when a condition in which the absolute value of the difference between the torque Trq and the torque command value Trq* remains small and a condition in which the acceleration Gx of the vehicle VC1 increases are both met than when the conditions are not met.

When the logical conjunction is true (S32: YES), the CPU 72 assigns a positive value α to a reward r (S34). When the logical conjunction is false (S32: NO), the CPU 72 assigns a negative value β to a reward r (S36). For example, the negative value β is the product of the positive value α and −1. When the process of S34 or S36 is completed, the CPU 72 updates the relationship defining data DR stored in the memory device 76 shown in FIG. 1. Here, a ε-soft on-policy Monte Carlo method is used.

That is, the CPU 72 adds the rewards r to respective returns R(Sj, Aj), which are determined by pairs of the states and the corresponding actions read through the process of S30 (S38). Here, R(Sj, Aj) collectively represents the returns R, each having one of the elements of the state set Sj as the state and one of the elements of the action set Aj as the action. Next, the CPU 72 averages each of the returns R(Sj, Aj), which are determined by pairs of the states and the corresponding actions read through the process of S30, and assigns the averaged values to the corresponding action value functions Q(Sj, Aj) (S40). In the averaging, the return R, which is calculated through the process of S38, simply needs to be divided using a value obtained by adding a predetermined number to the number of times the process S38 has been executed. The initial value of the return R simply needs to be set to the initial value of the corresponding action value function Q.

Subsequently, for each of the states read through the process of S30, the CPU 72 assigns, to an action Aj*, an action that is the combination of the throttle opening degree command value TA* and the retardation amount aop when the corresponding action value function Q(Sj, A) has the maximum value (S42). The sign A represents an arbitrary action that can be taken. The action Aj* can have different values depending on the type of the state obtained through the process of S30. In view of simplification, the action Aj* is described with the same sign.

Then, the CPU 72 updates the policy π (Aj|Sj) corresponding to each of the states obtained through the process of S30 (S44). That is, the CPU 72 sets the selection probability of the action Aj* selected through S42 to (1−ε)+ ε/|A|, where |A| represents the total number of actions. The number of the actions other than the action Aj* is represented by |A|−1. The CPU 72 sets the selection probability of each of the actions other than the action Aj* to ε/|A|. The process of S44 is based on the action value function Q, which has been updated through the process of S40. Accordingly, the relationship defining data DR, which defines the relationship between the state s and the action a, is updated so as to increase the return R.

When the process of step S44 is completed, the CPU 72 temporarily ends the series of processes illustrated in FIG. 4.

Referring back to FIG. 3, the CPU 72 temporarily ends the series of processes illustrated in FIG. 3 when the process of S28 is completed or when a negative determination is made in the process of S20 or S24. The processes from S10 to S26 are implemented by the CPU 72 executing the control program 74a, and the process of S28 is implemented by the CPU 72 executing the learning program 74b. The relationship defining data DR at the shipment of the vehicle VC1 is learned in advance through the process similar to the process shown in FIG. 3 while simulating the traveling of the vehicle on a test bench.

In the first embodiment, the energy use efficiency of the vehicle VC1 is obtained as environmental performance of the vehicle VC1 and it is determined whether the energy use efficiency of the vehicle VC1 is lower than a determination efficiency. When the energy use efficiency of the vehicle VC1 is determined as being lower than the determination efficiency, the update speed of the relationship defining data DR is increased by changing the manner of providing the reward r. This improves the energy use efficiency. Such a process is executed by the controller 70 in a series of processes illustrated in FIG. 5. The series of processes illustrated in FIG. 5 is implemented by the CPU 72 executing the control program 74a stored in the ROM 74.

Figure 5:
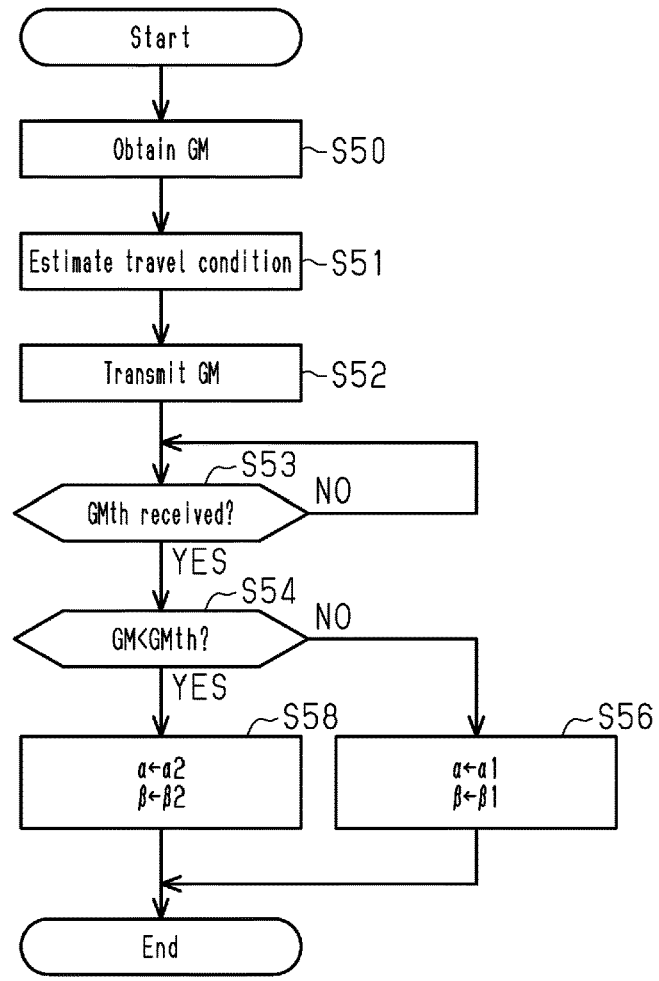
FIG. 5 is a flowchart illustrating a procedure of processes executed by the controller when transmitting and receiving information to and from the server.

The condition for starting the series of processes illustrated in FIG. 5 is, for example, that a travel distance RL of the vehicle VC1 increases by a specified distance RLth.

In the series of processes illustrated in FIG. 5, the CPU 72 obtains a fuel economy GM of the vehicle VC1 as a value indicating the energy use efficiency of the vehicle VC1 (S50). The CPU 72 obtains the fuel economy GM by dividing the fuel consumption amount in the internal combustion engine 10 by the travel distance RL of the vehicle VC1.

It is assumed that the condition for starting the series of processes illustrated in FIG. 5 includes a condition in which the travel distance RL of the vehicle VC1 increases by the specified distance RLth. In this case, the CPU 72 simply needs to obtain the fuel consumption amount for the vehicle VC1 to travel the specified distance RLth and obtain, as the fuel economy GM, a value obtained by dividing the fuel consumption amount by the specified distance RLth.

Next, the CPU 72 uses the state s obtained through the process of S10 in FIG. 3 and a travel environment of the vehicle VC1 to estimate a travel condition of the vehicle VC1 (S51). The travel environment is, for example, the climate in a region where the vehicle VC1 travels and a load capacity LC of the vehicle VC1. The CPU 72 obtains such a travel environment. Further, the CPU 72 uses the obtained state s to estimate the preference of a user driving the vehicle VC1 related to vehicle operation. For example, the CPU 72 estimates the preference of the user based on the operation speed of an in-vehicle operation member (such as accelerator pedal 86 or brake pedal) that determines the acceleration/deceleration of the vehicle VC1.

For example, the CPU 72 obtains the climate of a region where the vehicle VC1 travels by receiving, from a server located arranged outside of the vehicle VC1, the information related to the climate of the current place of the vehicle VC1. Further, the CPU 72 uses the detection result of a seat sensor provided in the vehicle body to acknowledge the number of occupants in the vehicle VC1, and uses the number of occupants to obtain the load capacity LC.

Subsequently, the CPU 72 transmits the obtained fuel economy GM to the server 130 (S52). In addition to the fuel economy GM, the CPU 72 transmits the estimated travel condition of the vehicle VC1 to the server 130.

Then, the CPU 72 determines whether a reference fuel economy GMth has been received from the server 130 (S53). The reference fuel economy GMth is set by the server 130. When the reception of the reference fuel economy GMth is not completed (S53: NO), the CPU 72 repeats the process of S53 until the reception is completed. When the reception of the reference fuel economy GMth is completed (S53: YES), the CPU 72 determines whether the fuel economy GM obtained in S50 is lower than the reference fuel economy GMth (S54). When the fuel economy GM is lower than the reference fuel economy GMth, the CPU 72 determines that the energy use efficiency of the vehicle VC1 is lower than the reference. When the fuel economy GM is greater than or equal to the reference fuel economy GMth, the CPU 72 does not determine that the energy use efficiency of the vehicle VC1 is lower than the reference.

When the fuel economy GM is greater than or equal to the reference fuel economy GMth (S54: NO), the CPU 72 sets a value α1 as the positive value α and sets a value β1 as the negative value β (S56). When the fuel economy GM is lower than the reference fuel economy GMth (S54: YES), the CPU 72 sets a value α2 as the positive value a and sets a value β2 as the negative value β (S58). The values α1, α2 are positive, and the value α2 is greater than the value α1. The values β1, β2 are negative, and the absolute value of the value β2 is greater than the absolute value of the value β1. After setting the positive value α and the negative value β in this manner, the CPU 72 ends the series of processes illustrated in FIG. 5.

Figure 6:
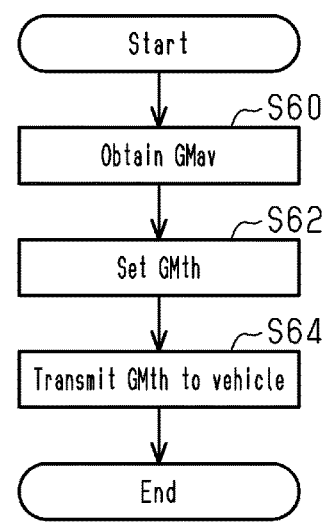
FIG. 6 is a flowchart illustrating a procedure of processes executed by the server.

FIG. 6 illustrates the flow of a series of processes executed by the server 130 when obtaining the reference fuel economy GMth. The series of processes illustrated in FIG. 6 is implemented by the CPU 132 executing the control program 134a stored in the ROM 134. The series of processes illustrated in FIG. 6 is executed when the information related to the fuel economy GM is received from any one of vehicles capable of communicating with the server 130.

In the series of processes illustrated in FIG. 6, the CPU 132 obtains an average fuel economy GMav of the vehicle (S60). That is, the CPU 132 selects, from the vehicles VC1, VC2, . . . capable of communicating with the server 130, all of the vehicles that are determined as having traveled under the same travel condition as the travel condition of the vehicle VC1. Then, the CPU 132 uses the fuel economy GM of each of the selected vehicles to calculate the average fuel economy GMav. For example, the CPU 132 calculates the average fuel economy GMav as the average value of the fuel economies GM of the selected vehicles.

Next, the CPU 132 uses the obtained average fuel economy GMav to obtain the reference fuel economy GMth (S62). For example, the average fuel economy GMav is set as the reference fuel economy GMth. Alternatively, the product of the average fuel economy GMav and a predetermined correction coefficient may be set as the reference fuel economy GMth. The correction coefficient may be fixed at a preset value or may be varied depending on the travel environment of the vehicle, such as season and area.

Then, the CPU 132 transmits the obtained reference fuel economy GMth to the vehicle VC1 that has transmitted the fuel economy GM (S64). When the transmission of the fuel economy GM is completed, the CPU 132 ends the series of processes illustrated in FIG. 6.

The operation and advantages of the first embodiment will now be described.

After the fuel economy GM of the vehicle VC1 is obtained, the information related to the fuel economy GM is transmitted to the server 130. Then, in the server 130, the reference fuel economy GMth is calculated and transmitted to the vehicle VC1.

The vehicle VC1 uses the reference fuel economy GMth received from the server 130 and the fuel economy GM obtained by the controller 70 to determine whether the energy use efficiency of the vehicle VC1 is lower than the standard. When the energy use efficiency of the vehicle VC1 is determined as being lower than the standard, an increase occurs in the update speed of the relationship defining data DR, which is used to operate the electronic devices of the vehicle VC1. Updating the relationship defining data DR in this manner causes the relationship between the state s of the vehicle VC1 and the action variable to become close to an optimal relationship.

The reason that the energy use efficiency of the vehicle VC1 is lower than the standard may be a delay in the update of the relationship defining data DR. When the relationship defining data DR corresponding to the present characteristics of the electronic devices of the vehicle VC1 is the optimal data, a delay in the update of the relationship defining data DR may mean that the relationship defining data DR is deviated from the optimal data.

In the first embodiment, when the energy use efficiency of the vehicle VC1 is determined as being lower than the standard, the update speed of the relationship defining data DR increases. This quickly reduces the deviation between the relationship defining data DR and the optimal data. Thus, when the energy use efficiency is low due to a delay in the update of the relationship defining data DR, the energy use efficiency is improved by increasing the update speed of the relationship defining data DR.

The first embodiment further achieves the following advantages.

(1) By calculating the reward r that results from the operation of the electronic devices of the vehicle VC1, it is possible to acknowledge what kind of reward is obtained by the operation of the electronic devices. Updating the relationship defining data DR in accordance with the update map conforming to reinforcement learning based on the obtained reward allows the relationship between the state of the vehicle VC1 and the action variable to be suitable for the traveling of the vehicle VC1. This optimizes the relationship between the state of the vehicle VC1 and the action variable for the traveling of the vehicle VC1.

The same vehicle type has individual differences in the characteristics of the installed electronic devices. In the first embodiment, the relationship defining data DR is updated by performing reinforcement learning in the vehicle VC1. That is, during use of the vehicle VC1, the relationship defining data DR is updated so as to correspond to the characteristics of the electronic devices installed in the vehicle VC1. This allows for the optimization of vehicle control in the vehicle VC1 without creating operation data through adaptation for each vehicle prior to the shipment of the vehicle.

Additionally, even if the characteristics of the electronic devices deteriorate over time, the relationship defining data DR is updated through reinforcement learning in correspondence with the over-time deterioration of the characteristics. Therefore, even if the characteristics of the electronic devices deteriorate over time, the vehicle VC1 can be controlled in correspondence with the characteristics of the electronic devices.

(2) When the energy use efficiency of the vehicle VC1 is determined as being lower than the standard, there is a possibility that optimization has not sufficiently progressed in the relationship between the state of the vehicle VC1 and the action variable. In the first embodiment, when the energy use efficiency of the vehicle is determined as being lower than the standard, the reward r provided when the characteristic of the vehicle VC1 meets a predetermined standard is further increased. Thus, after the energy use efficiency is determined as being lower than the determination performance, the relationship between the state of the vehicle VC1 and the action variable prior to that determination is optimized quickly. Accordingly, when the energy use efficiency is determined as being lower than the standard due to a delay in the optimization of the relationship between the state of the vehicle VC1 and the action variable, the energy use efficiency can be improved by changing the manner of providing the reward r.

(3) The reference fuel economy GMth is set based on the fuel economies GM of vehicles traveling under similar travel conditions. That is, the reference fuel economy GMth can be set to a value that is based on actual traveling of a vehicle instead of setting the reference fuel economy GMth to a fixed value in advance according to a vehicle type. Thus, the actual performance of the vehicle VC1 related to the energy use efficiency is properly acknowledged.

Second Embodiment

A second embodiment will now be described with reference to the drawings. The differences from the first embodiment will mainly be discussed.

In the second embodiment, the energy use efficiency of the vehicle VC1 is obtained as the environmental performance of the vehicle VC1 and it is determined whether the energy use efficiency of the vehicle VC1 is lower than the determination efficiency. When the energy use efficiency of the vehicle VC1 is determined as being lower than the determination efficiency, the relationship defining data DR of a different vehicle VC2 in which the energy use efficiency is higher than the determination efficiency is received and the relationship defining data DR stored in the memory device 76 is replaced with the received relationship defining data DR. This improves the energy use efficiency. Such a process is executed by the controller 70 in a series of processes illustrated in FIG. 7. The series of processes illustrated in FIG. 7 is implemented by the CPU 72 executing the control program 74a stored in the ROM 74.

Figure 7:
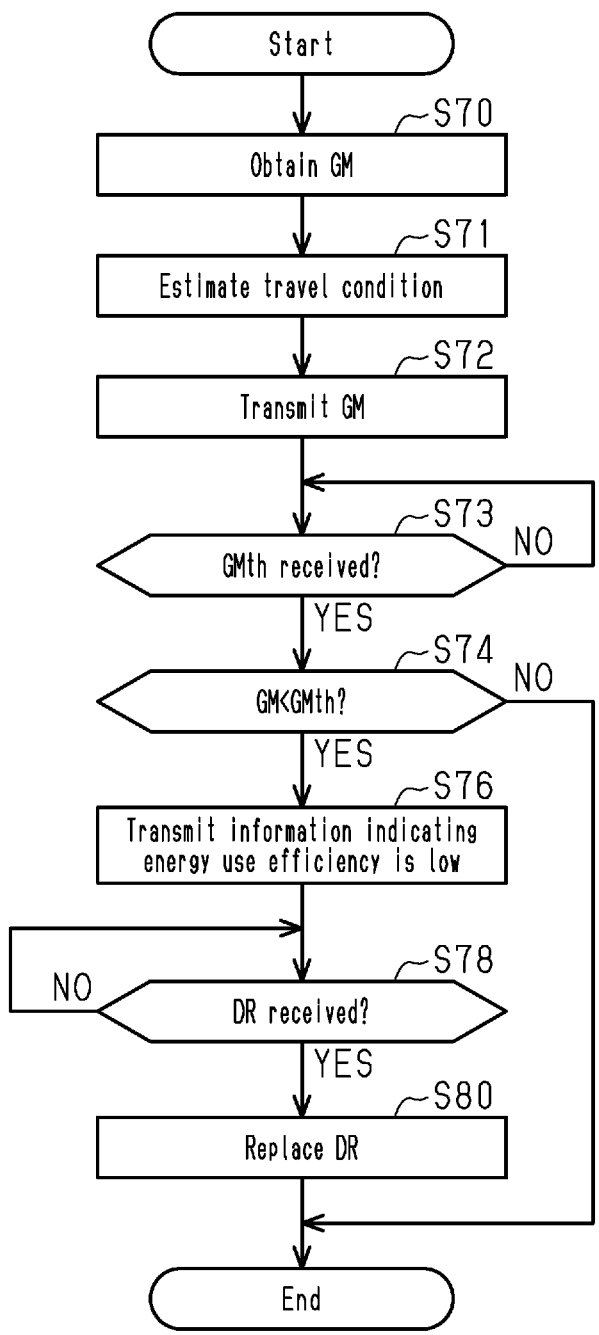
FIG. 7 is a flowchart illustrating a procedure of processes executed by the controller according to a second embodiment when transmitting and receiving information to and from the server.

In the series of processes illustrated in FIG. 7, in the same manner as S50 to S53 in FIG. 5, the CPU 72 obtains the fuel economy GM of the vehicle VC1 (S70) and obtains the travel condition of the vehicle VC1 (S71). Further, the CPU 72 transmits the fuel economy GM and the travel condition to the server 130 (S72) and receives the reference fuel economy GMth from the server 130 (S73: YES). Then, the CPU 72 determines whether the fuel economy GM obtained in S70 is lower than the reference fuel economy GMth (S74). When the fuel economy GM is greater than or equal to the reference fuel economy GMth (S74: NO), the CPU 72 ends the series of processes illustrated in FIG. 7. That is, the replacement of the relationship defining data DR stored in the memory device 76 is not performed.

When the fuel economy GM is lower than the reference fuel economy GMth (S74: YES), the CPU 72 transmits to the server 130 the information indicating that the energy use efficiency of the vehicle VC1 is low (S76). Next, the CPU 72 determines whether the relationship defining data DR of a different vehicle has been received as a response to the transmission (S78). When the reception of the relationship defining data DR of the different vehicle is not completed (S78: NO), the CPU 72 repeats the process of S78 until the reception of the relationship defining data DR is completed. When the reception of the relationship defining data DR of the different vehicle is completed (S78: YES), the CPU 72 causes the memory device 76 to store the received relationship defining data DR (S80). That is, the CPU 72 replaces the relationship defining data DR of the memory device 76 with the relationship defining data DR of the different vehicle. When the replacement of the relationship defining data DR is completed, the CPU 72 ends the series of processes illustrated in FIG. 7.

Figure 8:
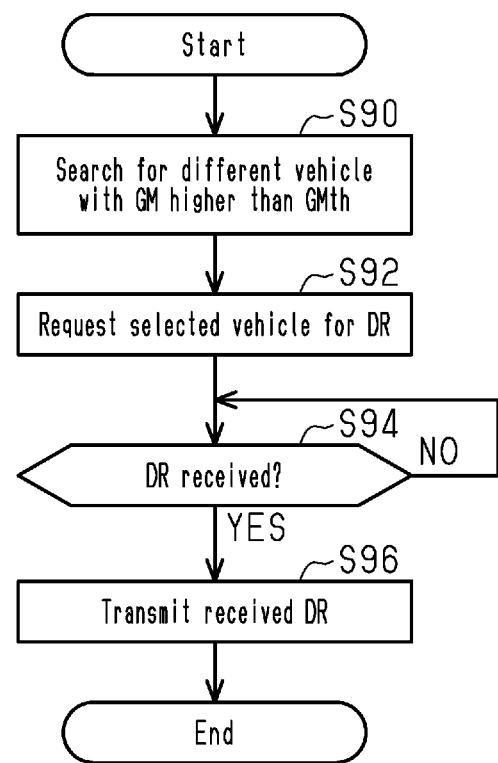
FIG. 8 is a flowchart illustrating a procedure of processes executed by the server.

FIG. 8 illustrates the flow of a series of processes executed by the server 130 when the server 130 receives from the vehicle VC1 the information indicating that the energy use efficiency of the vehicle VC1 is low. The series of processes illustrated in FIG. 8 is implemented by the CPU 132 executing the control program 134a stored in the ROM 134.

In the series of processes illustrated in FIG. 8, the CPU 132 searches for a vehicle in which the fuel economy GM is higher than the reference fuel economy GMth, from multiple vehicles that have been used to obtain the reference fuel economy GMth (S90). When multiple vehicles meet the condition that the fuel economy GM is higher than the reference fuel economy GMth, the CPU 132 selects a vehicle with the highest fuel economy GM. Next, when the vehicle that has been selected is referred to as a selected vehicle, the CPU 132 requests the selected vehicle to transmit the relationship defining data DR used in the selected vehicle (S92). Then, the CPU 132 determines whether the relationship defining data DR of the selected vehicle has been received from the selected vehicle (S94). When the reception of the relationship defining data DR is not completed (S94: NO), the CPU 132 repeats the process of S94 until the reception of the relationship defining data DR of the selected vehicle is completed. When the reception of the relationship defining data DR is completed (S94: YES), the CPU 132 transmits the relationship defining data DR of the selected vehicle to the vehicle VC1 that has transmitted the information indicating that the energy use efficiency is low (S96).

The second embodiment achieves the following advantage in addition to the advantages similar to the above-described advantages (1) and (3).

(4) In the vehicle VC1, the reference fuel economy GMth received from the server 130 and the fuel economy GM obtained by the controller 70 is used to determine whether the energy use efficiency of the vehicle VC1 is lower than the standard. When the energy use efficiency of the vehicle VC1 is determined as being lower than the standard, the information indicating that determination is transmitted from the vehicle VC1 to the server 130. As a result, the relationship defining data DR of a different vehicle in which the fuel economy GM is higher than the reference fuel economy GMth is transmitted from the server 130 to the vehicle VC1. Then, the relationship defining data DR stored in the memory device 76 is replaced with the relationship defining data DR of the different vehicle. That is, the relationship defining data DR used to operate the electronic devices of the vehicle VC1 is updated such that the energy use efficiency increases.

The reason that the energy use efficiency of the vehicle VC1 is lower than the standard may be a delay in the update of the relationship defining data DR. In other words, the update of the relationship defining data DR has progressed in a vehicle in which the energy use efficiency is higher than the standard.

In the second embodiment, when the energy use efficiency of the vehicle VC1 is determined as being lower than the standard, the relationship defining data DR stored in the memory device 76 is replaced with the relationship defining data DR of a different vehicle in which the fuel economy GM is higher than the reference fuel economy GMth. That is, the relationship defining data DR stored in the memory device 76 is replaced with the relationship defining data DR in which the update has progressed. Accordingly, when the energy use efficiency is low due to a delay in the update of the relationship defining data DR, the energy use efficiency of the vehicle VC1 can be improved by operating the electronic devices using the relationship defining data DR subsequent to being replaced.

Correspondence

The correspondence between the items in the above-described embodiments and the items described in the claims is as follows. In the following section, the correspondence is shown for each of the numbers in the claims. [1] The execution device includes the CPU 72 and ROM 74 and the CPU 132 and ROM 134 in FIG. 2. The memory device corresponds to the memory device 76 in FIG. 2. The operation data corresponds to the relationship defining data DR stored in the memory device 76 in FIG. 2. The obtaining process corresponds to the process of S10 in FIG. 3 and the process of S30 in FIG. 4. The operating process corresponds to the process of S14 in FIG. 3. The performance determining process corresponds to the process of S54 in FIG. 5 and the process of S74 in FIG. 7. The data updating process includes the process of S28 in FIG. 3 and the processes from S54 to S58 in FIG. 3. Further, the data updating process includes the processes from S76 to S80 in FIG. 7 and the processes from S90 to S96 in FIG. 8. [2] The reward calculating process corresponds to the processes from S32 to S36 in FIG. 4. The updating process corresponds to the processes from S38 to S44 in FIG. 4. The relationship defining data corresponds to the relationship defining data DR stored in the memory device 76 in FIG. 2. The update map corresponds to the map defined by the command that executes the processes from S38 to S44 of FIG. 5 in the learning program 74b. [3] The data updating process corresponds to the process of S28 in FIG. 3 and the processes from S54 to S58 in FIG. 5. [4] The data updating process includes the processes from S76 to S80 in FIG. 7 and the processes from S90 to S96 in FIG. 8. [5] The condition estimating process corresponds to the process of S51 in FIG. 5 and the process of S71 in FIG. 7. [5], [6] The determination performance setting process corresponds to the process of S62 in FIG. 6. [6] The index value indicating the environmental performance of a vehicle corresponds to the fuel economy GM. [8] The first execution device corresponds to the CPU 72 and ROM 74 in FIG. 2. The second execution device corresponds to the CPU 132 and ROM 134 in FIG. 2. [9], [10] The vehicle controller corresponds to the controller 70 in FIG. 2. [11] The server corresponds to the server 130 in FIG. 2.

Modifications

The above-described embodiments may be modified as follows. The above-described embodiments and the following modifications can be combined as long as the combined modifications remain technically consistent with each other.

Regarding Environmental Performance of Vehicle

When a rotating electric machine is included as a propelling force generator as described in the Regarding Vehicle section below, the power consumption efficiency of a vehicle may be obtained as the energy use efficiency. For example, the power consumption efficiency is obtained by dividing, by a specified distance, the power consumption amount for the vehicle to travel the specified distance. When the power consumption efficiency is lower than the determination efficiency, the energy use efficiency of the vehicle VC1 is determined as being lower than the standard.

When the vehicle includes the internal combustion engine 10 as a propelling force generator like the above-described embodiments, the exhaust properties of the vehicle may be obtained as the environmental performance. Examples of the exhaust properties include the number of discharged particulates contained in exhaust gas that is discharged out of the vehicle. In this case, reinforcement learning is performed such that the exhaust properties improve (i.e., such that the number of discharged particulates decreases). Then, the data updating process updates the relationship defining data DR such that the exhaust properties of the vehicle improve.

Regarding Performance Determining Process

In the above-described embodiments, the controller 70 determines whether the environmental performance of the vehicle is lower than the determination performance. Instead, this determination may be executed by the server 130. In this case, for example, in the first embodiment, when the reference fuel economy GMth is set by the server 130, the CPU 132 of the server 130 determines whether the fuel economy GM of the vehicle VC1 is lower than the reference fuel economy GMth and transmits the determination result to the controller 70 of the vehicle VC1. The controller 70 uses the received determination result to set the positive value α and the negative value β.

In the second embodiment, when the reference fuel economy GMth is set by the server 130, the CPU 132 of the server 130 determines whether the fuel economy GM of the vehicle VC1 is lower than the reference fuel economy GMth. When determining that the fuel economy GM of the vehicle VC1 is lower than the reference fuel economy GMth, the CPU 132 executes the series of processes illustrated in FIG. 8 to transmit the relationship defining data DR used for the selected vehicle to the vehicle VC1.

Regarding Obtaining of Fuel Economy GM

In the above-described embodiments, the travel distance and fuel consumption amount during one trip of the vehicle VC1 may be obtained so that the value obtained by dividing the fuel consumption amount by the travel distance is obtained as the fuel economy GM. In this case, the travel distance during one trip of the vehicle VC1 may be longer than the specified distance used in the above-described embodiments. Further, when the travel distance during one trip of the vehicle VC1 is long, the climate of a region where the vehicle VC1 travels may change in the middle of the traveling of the vehicle VC1. Thus, in such a case, as long as the load capacity LC of the vehicle VC1 (i.e., the number of occupants in the vehicle VC1) is obtained as the travel condition, other information such as climate does not need to be obtained.

In the above-described embodiments, when a relatively short distance is set as the specified distance, the information other than the load capacity LC (i.e., the number of occupants) and climate may be obtained as the travel condition. Examples of the other information include the information related to a road surface where the vehicle VC1 travels (i.e., the gradient and μ-value of the road surface).

Regarding Condition Estimating Process

In the above-described embodiments, the travel condition is estimated based on both the travel environment of the vehicle and the preference of the user estimated from the operating speed of an in-vehicle operation member such as the accelerator pedal 86, which is an example of the preference of the user. Instead, the travel condition may be estimated based on only one of the travel environment and the preference of the user related to the operation of the vehicle VC1.

Only a part of climate, road surface information (road surface μ-value, road surface gradient), and the load capacity LC of the vehicle may be obtained as the travel environment of the vehicle.

To set the reference fuel economy GMth, the travel condition of the vehicle does not need to be taken into account.

Regarding Determination Performance

In the above-described embodiments, the average value of the fuel economies GM of all the vehicles that are determined as having traveled on the same condition as the travel condition of the vehicle VC1 or a value corresponding to the average value is set as the reference fuel economy GMth. Instead, for example, the fuel economy GM of a vehicle with the best fuel economy GM of all the vehicles or a value corresponding to the fuel economy GM of a vehicle with the best fuel economy GM of all the vehicles may be set as the reference fuel economy GMth.

A value defined from, for example, the specification of the vehicle VC1 may be set as the reference fuel economy GMth.

When a parameter other than the fuel economy GM is obtained as the environmental performance of the vehicle, the data corresponding to the parameter simply needs to be obtained as the determination performance. For example, when the power consumption efficiency is obtained as the environmental performance as described above in the Regarding Environmental Performance section, a value that allows for determination whether the power consumption efficiency is low simply needs to be set as the determination performance. Further, when the exhaust properties of the vehicle are obtained as the environmental performance as described in the Regarding Environmental Performance section, a value that allows for determination whether the exhaust properties are bad simply needs to be set as the determination performance.

Regarding Data Updating Process

In the second embodiment, when the energy use efficiency of the vehicle VC1 is determined as being lower than the standard, the relationship defining data DR stored in the memory device 76 is replaced with the relationship defining data DR of a different vehicle in which the fuel economy GM is higher than the reference fuel economy GMth. In this case, when multiple vehicles have a fuel economy GM that is higher than the reference fuel economy GMth, one of the vehicles other than a vehicle with the highest fuel economy GM may be selected so that the relationship defining data DR of the vehicle is stored in the memory device 76 of the vehicle VC1.

In the first embodiment, when the energy use efficiency of the vehicle VC1 is determined as being lower than the standard, the positive value α is changed from the value α1 to the value α2 and the negative value β is changed from the value β1 to the value β2. However, as long as the positive value a is changed from the value α1 to the value α2, the negative value β may be maintained at the value β1. Conversely, as long as the negative value β is changed from the value β1 to the value β2, the positive value α may be maintained at the value α1.

Regarding Reduction of Dimensions of Table-Type Data

The method of reducing the dimensions of table-type data is not limited to the one in the above-described embodiments. For example, the accelerator operation amount PA rarely reaches the maximum value. Accordingly, the action value function Q does not necessarily have to be defined for the state in which the accelerator operation amount PA is greater than or equal to the specified amount, and the throttle opening degree command value TA* and the like may be adapted independently when the accelerator operation amount PA is greater than or equal to the specified amount. Further, the dimensions may be reduced by removing, from possible values of the action, values at which the throttle opening degree command value TA* is greater than or equal to a specified value.

Regarding Relationship Defining Data

In the above-described embodiments, the action value function Q is a table-type function. Instead, for example, a function approximator may be used.

For example, instead of using the action value function Q, the policy π may be expressed by a function approximator that uses the state s and the action a as independent variables and uses the probability of taking the action a as a dependent variable, and the parameters defined by the function approximator may be updated in correspondence with the reward r.

Regarding Operation Data

As long as the operation data is used to obtain an operation command value for an electronic device of the vehicle VC1, the operation data may differ from the relationship defining data DR. For example, the data updated by a learning process that differs from reinforcement learning may be used as the operation data.

Regarding Operating Process

For example, when using a function approximator as the action value function Q as described in the Regarding Relationship Defining Data section, all the groups of discrete values related to actions that are independent variables of the table-type function of the above-described embodiments simply need to be input to the action value function Q together with the state s, so as to specify the action a that maximizes the action value function Q. In this case, for example, while the specified action a is mainly employed for operation, the other actions simply need to be selected at a predetermined probability.

For example, when the policy η is a function approximator that uses the state s and the action a as independent variables and uses the probability that the action a will be taken as a dependent variable as in the Regarding Relationship Defining Data section, the action a simply needs to be selected based on the probability indicated by the policy π.

Regarding Update Map

The ε-soft on-policy Monte Carlo method is executed in the processes from S38 to S44. Instead, for example, an off-policy Monte Carlo method may be used. Also, Monte Carlo methods do not have to be used. Instead, for example, an off-policy TD method may be used. As another option, an on-policy TD method such as a SARSA method may be used. Alternatively, an eligibility trace method may be used as on-policy learning.

For example, when the policy η is expressed using a function approximator and the policy η is directly updated based on the reward r as described in the Regarding Relationship Defining Data section, the update map simply needs to be constructed using, for example, a policy gradient method.

The present disclosure is not limited to the configuration in which only one of the action value function Q and the policy π is directly updated using the reward r. For example, the action value function Q and the policy π may be separately updated as in an actor critic method. Further, in an actor critic method, a value function may be updated instead of the action value function Q.

Regarding Action Variable

In the above-described embodiments, the throttle opening degree command value TA* is used as an example of the variable related to the opening degree of a throttle valve, which is an action variable. Instead, for example, the responsivity of the throttle opening degree command value TA* to the accelerator operation amount PA may be expressed by dead time and a secondary delay filter, and three variables in total including the dead time and two variables defining the secondary delay filter may be used as variables related to the opening degree of the throttle valve. In this case, the state variable is preferably the amount of change per unit time of the accelerator operation amount PA instead of the time-series data of the accelerator operation amount PA.

In the above-described embodiments, the variable related to the opening degree of the throttle valve and the variable related to the gear ratio are used as examples of action variables. Instead, for example, in addition to the variable related to the opening degree of the throttle valve and the variable related to the gear ratio, the variable related to ignition timing and the variable related to air-fuel ratio control may be used.

As described below in the Regarding Internal Combustion Engine section, in the case of a compression ignition internal combustion engine, a variable related to an injection amount simply needs to be used instead of the variable related to the opening degree of the throttle valve. In addition to this, for example, it is possible to use a variable related to injection timing, a variable related to the number of times of injection within a single combustion cycle, and a variable related to the time interval between the ending point in time of one fuel injection and the starting point in time of the other fuel injection in two fuel injections that are consecutive in time for a single cylinder within a single combustion cycle.

For example, in a case where the transmission 50 is a multi-speed transmission, the action variable may be the value of the current supplied to the solenoid valve that adjusts an engagement state of the clutch using hydraulic pressure.

When a rotating electric machine is subject to the operation corresponding to the action variable as described below in the Regarding Electronic Device section, the action variable simply needs to include the torque and current of the rotating electric machine. That is, a load variable, which is related to the load on the propelling force generator, is not limited to the variable and injection amount related to the opening degree of the throttle valve, and may be the torque and current of the rotating electric machine.

When the lockup clutch 42 is subject to the operation corresponding to the action variable as described below in the Regarding Electronic Device section, the action variable simply needs to include a variable that indicates an engagement state of the lockup clutch 42. When the action variable includes the engagement state of the lockup clutch 42, it is especially effective to change the value of the action variable depending on the level of the priority of a request item indicating that the energy use efficiency is increased.

Regarding State

In the above-described embodiments, the time-series data of the accelerator operation amount PA includes six values that are sampled at equal intervals. Instead, the data simply needs to include two or more values sampled at different sampling points in time. It is preferred that the data include three or more sampled values or that data have equal sampling intervals.

The state variable related to the accelerator operation amount is not limited to the time-series data of the accelerator operation amount PA. Instead, for example, as described in the Regarding Action Variable section, the amount of change per unit time of the accelerator operation amount PA may be used.

For example, when the current value of the solenoid valve is used as the action variable as described in the Regarding Action Variable section, the state simply needs to include the rotation speed of the input shaft 52 of the transmission, the rotation speed of the output shaft 54, and the hydraulic pressure regulated by the solenoid valve. When the torque or output of the rotating electric machine is used as the action variable as described in the Regarding Action Variable section, the state simply needs to include the state of charge and the temperature of the battery. When the action includes the load torque of the compressor or the power consumption of the air conditioner as described in the Regarding Action Variable section, the state simply needs to include the temperature in the passenger compartment.

Regarding Electronic Device

The electronic devices of the internal combustion engine subject to the operation corresponding to the action variable are not limited to the throttle valve 14 and may be the ignition device 26 or the fuel injection valve 16.

In the electronic devices subject to the operation corresponding to the action variable, the driving system device arranged between the propelling force generator and the driven wheels is not limited to the transmission 50 and may be the lockup clutch 42.

When the rotating electric machine is included as the propelling force generator as described below in the Regarding Vehicle section, the electronic devices subject to the operation corresponding to the action variable may be a power conversion circuit, such as an inverter connected to the rotating electric machine. Further, the electronic device is not limited to an in-vehicle driving system and may be, for example, an in-vehicle air conditioner. Even in this case, when, for example, the in-vehicle air conditioner is driven by the rotation power of the propelling force generator, the power of the driven wheels 60 in the power of the propelling force generator is dependent on the load torque of the in-vehicle air conditioner. Thus, for example, it is effective to include the load torque of the in-vehicle air conditioner in the action variable. Even when the in-vehicle air conditioner does not use the rotation power of the propelling force generator, the energy use efficiency is affected. Thus, it is effective to include the power consumption of the in-vehicle air conditioner in the action variable.

Regarding Execution Device

The execution device is not limited to a device that includes a CPU and a ROM and executes software processing. At least a part of the processes executed by the software in the above-described embodiments may be included in a dedicated hardware circuit such as ASIC that executes hardware processing. That is, the execution device may be modified as long as it has any one of the following configurations (a) to (c). (a) A configuration including a processor that executes all of the above-described processes according to programs and a program storage device such as a ROM that stores the programs. (b) A configuration including a processor and a program storage device that execute a part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

Regarding Internal Combustion Engine

The internal combustion engine does not necessarily include, as the fuel injection valve, a port injection valve that injects fuel into the intake passage 12. Instead, the internal combustion engine may include a direct injection valve that directly injects fuel into the combustion chamber 24 or may include a port injection valve and a direct injection valve.

The internal combustion engine is not limited to a spark-ignition internal combustion engine. Instead, the internal combustion engine may be a compression ignition internal combustion engine or the like that uses, for example, light oil as fuel.

Regarding Vehicle

The vehicle is not limited to a vehicle that includes only an internal combustion engine as the propelling force generator of the vehicle. Instead, the vehicle may be a hybrid vehicle includes both an internal combustion engine and a rotating electric machine. Alternatively, the vehicle may be a vehicle in which its propelling force generator includes only a rotating electric machine like an electric vehicle or a fuel-cell vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle control method using a memory device and an execution device, the vehicle control method comprising:
storing, in the memory device, operation data used to operate an electronic device of a vehicle; and
with the operation data stored in the memory device, by the execution device, executing:
an obtaining process that obtains a state of the vehicle based on a detection value of a sensor provided in the vehicle;
an operating process that operates the electronic device based on the state of the vehicle obtained by the obtaining process and the operation data;
a performance determining process that determines whether an environmental performance of the vehicle is lower than a determination performance when the electronic device is operated by executing the operating process; and
a data updating process that updates the operation data so as to increase the environmental performance of the vehicle in a case where the performance determining process determines that the environmental performance of the vehicle is lower than the determination performance,
wherein:
the execution device includes a first execution device provided in the vehicle and a second execution device that communicates with the first execution device,
the memory device is provided in the vehicle,
the obtaining process and the operating process are executed by the first execution device,
the performance determining process is executed by the first execution device or the second execution device, and
the data updating process is executed through cooperation of the first execution device and the second execution device.

2. The vehicle control method according to claim 1, wherein
the operation data is relationship defining data defining a relationship between the state of the vehicle and an action variable, the action variable being related to operation of the electronic device,
the operating process operates the electronic device based on a value of the action variable, the value being determined by the state of the vehicle obtained by the obtaining process and the relationship defining data,
the vehicle control method further comprises executing, by the execution device:
a reward calculating process that provides, based on the state of the vehicle when the electronic device is operated, a reward that is greater reward when a characteristic of the vehicle meets a predetermined standard than when the characteristic of the vehicle does not meet the predetermined standard; and
an updating process that updates the relationship defining data by inputting, to an update map defined in advance, the state of the vehicle when the electronic device is operated, the value of the action variable used to operate the electronic device, and the reward corresponding to the operation of the electronic device, and
the update map outputs the updated relationship defining data so as to increase an expected return for the reward when the electronic device is operated in accordance with the relationship defining data.

3. The vehicle control method according to claim 2, wherein the data updating process updates the relationship defining data so as to increase the environmental performance of the vehicle by setting the reward, which is provided when the characteristic of the vehicle meets the predetermined standard, to be greater in the case where the performance determining process determines that the environmental performance of the vehicle is lower than the determination performance than in a case where the performance determining process does not determine that the environmental performance of the vehicle is lower than the determination performance.

4. The vehicle control method according to claim 2, wherein the data updating process updates the relationship defining data so as to increase the environmental performance of the vehicle by replacing the relationship defining data stored in the memory device with relationship defining data of a different vehicle in which the environmental performance is higher than the determination performance.

5. The vehicle control method according to claim 1, comprising executing, by the execution device:
a condition estimating process that estimates a travel condition of the vehicle based on the state of the vehicle obtained by the obtaining process and a travel environment of the vehicle; and
a determination performance setting process that sets the determination performance based on environmental performances of vehicles traveling under a travel condition that is determined as being the same as the travel condition of the vehicle that has been estimated by the condition estimating process.

6. The vehicle control method according to claim 5, wherein the determination performance setting process sets the determination performance based on an average of index values indicating the environmental performances of the vehicles.

7. The vehicle control method according to claim 1, wherein the environmental performance of the vehicle is an energy use efficiency of the vehicle.

8. A vehicle controller, comprising an execution device and a memory device, wherein
the memory device is configured to store operation data used to operate an electronic device of a vehicle, and
with the operation data stored in the memory device, the execution device is configured to execute:
an obtaining process that obtains a state of the vehicle based on a detection value of a sensor provided in the vehicle;
an operating process that operates the electronic device based on the state of the vehicle obtained by the obtaining process and the operation data;
a performance determining process that determines whether an environmental performance of the vehicle is lower than a determination performance when the electronic device is operated by executing the operating process; and
a data updating process that updates the operation data so as to increase the environmental performance of the vehicle in a case where the performance determining process determines that the environmental performance of the vehicle is lower than the determination performance,
wherein:
the execution device includes a first execution device provided in the vehicle and a second execution device that communicates with the first execution device,
the memory device is provided in the vehicle,
the obtaining process and the operating process are executed by the first execution device,
the performance determining process is executed by the first execution device or the second execution device, and
the data updating process is executed through cooperation of the first execution device and the second execution device.

9. A vehicle controller, comprising an execution device and a memory device, wherein
the memory device is configured to store operation data used to operate an electronic device of a vehicle,
with the operation data stored in the memory device, the execution device is configured to execute:
an obtaining process that obtains a state of the vehicle based on a detection value of a sensor provided in the vehicle;
an operating process that operates the electronic device based on the state of the vehicle obtained by the obtaining process and the operation data;
a performance determining process that determines whether an environmental performance of the vehicle is lower than a determination performance when the electronic device is operated by executing the operating process; and
a data updating process that updates the operation data so as to increase the environmental performance of the vehicle in a case where the performance determining process determines that the environmental performance of the vehicle is lower than the determination performance,
the operation data is relationship defining data defining a relationship between the state of the vehicle and an action variable, the action variable being related to operation of the electronic device,
the operating process operates the electronic device based on a value of the action variable, the value being determined by the state of the vehicle obtained by the obtaining process and the relationship defining data,
the execution device is further configured to execute:
a reward calculating process that provides, based on the state of the vehicle when the electronic device is operated, a reward that is greater reward when a characteristic of the vehicle meets a predetermined standard than when the characteristic of the vehicle does not meet the predetermined standard; and
an updating process that updates the relationship defining data by inputting, to an update map defined in advance, the state of the vehicle when the electronic device is operated, the value of the action variable used to operate the electronic device, and the reward corresponding to the operation of the electronic device,
the update map outputs the updated relationship defining data so as to increase an expected return for the reward when the electronic device is operated in accordance with the relationship defining data,
the data updating process updates the relationship defining data so as to increase the environmental performance of the vehicle by replacing the relationship defining data stored in the memory device with relationship defining data of a different vehicle in which the environmental performance is higher than the determination performance,
the execution device includes a first execution device provided in the vehicle and a second execution device that communicates with the first execution device,
the memory device is provided in the vehicle,
the obtaining process and the operating process are executed by the first execution device,
the performance determining process is executed by the first execution device or the second execution device,
the data updating process is executed through cooperation of the first execution device and the second execution device, and the vehicle controller comprises the first execution device and the memory device.

10. A server capable of communicating with a vehicle controller including an execution device and a memory device, wherein
the memory device is configured to store operation data used to operate an electronic device of a vehicle,
with the operation data stored in the memory device, the execution device is configured to execute:
an obtaining process that obtains a state of the vehicle based on a detection value of a sensor provided in the vehicle;
an operating process that operates the electronic device based on the state of the vehicle obtained by the obtaining process and the operation data;
a performance determining process that determines whether an environmental performance of the vehicle is lower than a determination performance when the electronic device is operated by executing the operating process; and
a data updating process that updates the operation data so as to increase the environmental performance of the vehicle in a case where the performance determining process determines that the environmental performance of the vehicle is lower than the determination performance,
the operation data is relationship defining data defining a relationship between the state of the vehicle and an action variable, the action variable being related to operation of the electronic device,
the operating process operates the electronic device based on a value of the action variable, the value being determined by the state of the vehicle obtained by the obtaining process and the relationship defining data,
the execution device is further configured to execute:
a reward calculating process that provides, based on the state of the vehicle when the electronic device is operated, a reward that is greater reward when a characteristic of the vehicle meets a predetermined standard than when the characteristic of the vehicle does not meet the predetermined standard; and
an updating process that updates the relationship defining data by inputting, to an update map defined in advance, the state of the vehicle when the electronic device is operated, the value of the action variable used to operate the electronic device, and the reward corresponding to the operation of the electronic device,
the update map outputs the updated relationship defining data so as to increase an expected return for the reward when the electronic device is operated in accordance with the relationship defining data,
the data updating process updates the relationship defining data so as to increase the environmental performance of the vehicle by replacing the relationship defining data stored in the memory device with relationship defining data of a different vehicle in which the environmental performance is higher than the determination performance,
the execution device includes a first execution device provided in the vehicle and a second execution device that communicates with the first execution device,
the memory device is provided in the vehicle,
the obtaining process and the operating process are executed by the first execution device,
the performance determining process is executed by the first execution device or the second execution device,
the data updating process is executed through cooperation of the first execution device and the second execution device, and
the server is capable of communicating with the vehicles and comprises the second execution device.

* * * * *